R. L. MORGAN.
BODY FOR TRUCKS.
APPLICATION FILED MAY 8, 1917.
1,298,766.
Patented Apr. 1, 1919.
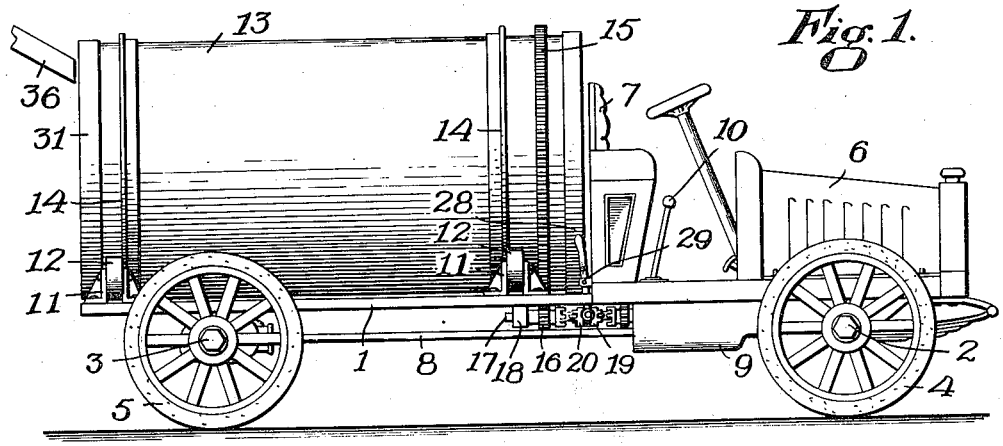
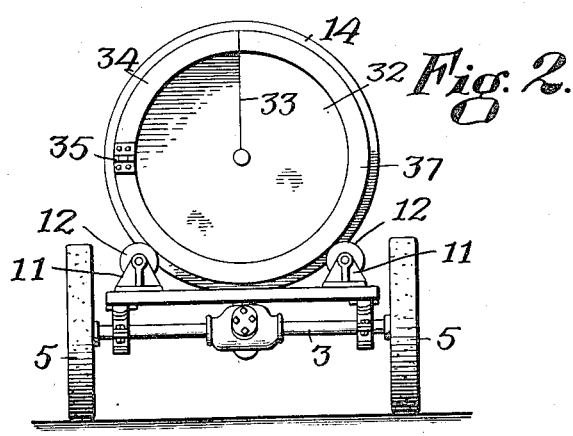
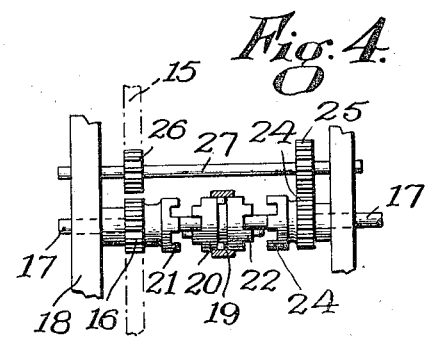
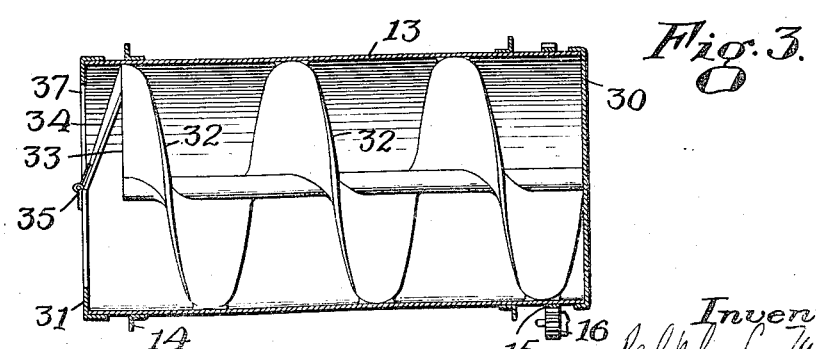
Inventor
Ralph L. Morgan
By Fowler & Kennedy
Attorneys

UNITED STATES PATENT OFFICE.

RALPH L. MORGAN, OF WORCESTER, MASSACHUSETTS.

BODY FOR TRUCKS.

1,298,766.   Specification of Letters Patent.   Patented Apr. 1, 1919.

Application filed May 8, 1917. Serial No. 167,307.

*To all whom it may concern:*

Be it known that I, RALPH L. MORGAN, a citizen of the United States, residing at Worcester, in the county of Worcester and Commonwealth of Massachusetts, have invented a new and useful Improvement in Bodies for Trucks, of which the following, together with the accompanying drawings, is a specification.

The present invention relates to bodies for trucks, and embodies a new and improved construction for the body or load carrying shell of a vehicle, whereby the loading and unloading of the same is greatly facilitated, over constructions now in ordinary use.

My invention is applicable to all classes of trucks, both horse drawn and self propelled, as well as to railroad freight cars, and all other classes of similar transportation apparatus. However, my invention is particularly applicable to motor trucks, and in the following description I have set forth the adaptation of my improved body to a motor truck, reference being had in this connection to the accompanying illustrative drawings, in which—

Figure 1 is a side view, illustrating a motor truck equipped with my improved body.

Fig. 2 is a rear end view of the same, and Fig. 3 is a longitudinal sectional view through the body.

Fig. 4 is a detail plan view of a portion of the operating mechanism.

Like reference characters refer to like parts in the different views.

I have illustrated by way of example, a conventional form of motor truck, the same comprising a chassis frame 1 which is suspended by the usual springs from the front and rear axles 2 and 3 respectively of the vehicle, the latter being carried by the front wheels 4 and rear or driving wheels 5. The driving motor is located under the usual hood 6, which is disposed in front of the driver's seat 7. The power of said motor is transmitted to the rear wheels by the usual propeller shaft 8 which is connected, through gearing in the ordinary transmission box 9, with said motor, said gearing being operable, in the usual way, by a shift lever 10 to effect the forward and reverse rotation of the driving wheels 5 at varying speeds with relation to the speed of the motor.

The chassis frame 1 at opposite sides thereof provides pairs of brackets 11, 11, serving as journals for rollers 12, 12. Said rollers 12, of which two pairs are herein provided, serve for the support of a cylindrical shell 13, which is mounted thereon above the chassis frame at the rear of the driver's seat 7. To this end, the rollers 12 are preferably arranged to coöperate with annular flanges 14 on the periphery of shell 13, whereby to prevent endwise movement of said shell, but permitting its free and unobstructed rotation on the rollers 12, upon which it rests by gravity. The rotation of the shell 13 is accomplished by means of an annular gear ring 15 secured to and surrounding the same near one end, said gear ring 15 meshing with a pinion 16, which is loose on a shaft 17. The shaft 17 is carried in a bearing 18 on the chassis frame 1 at the rear of the transmission case 9, the other end of said shaft projecting into said transmission case and having a suitable gear thereon, not shown, by which it is driven from the motor, when the gear shift lever 10 is in neutral position.

The shaft 17 thus rotates idly when the vehicle is at rest; when it is desired to rotate the shell 13, a collar 19 which is keyed or splined on shaft 17, is moved to the left, Fig. 4, to carry its clutch teeth 20 into engagement with corresponding clutch teeth 21 on the hub of pinion 16, thus causing the rotation of said pinion with the shaft 17, and thereby rotating the shell 13. To effect the rotation of the shell 13 in the opposite direction, the collar 19 is moved to the right, Fig. 4, whereby its clutch teeth 22 are caused to engage with corresponding clutch teeth 23 on the hub of a loose pinion 24, the latter being connected, by gearing 25, 26, and shaft 27 with the gear ring 15, serving to rotate the shell in the opposite direction from which it is rotated when directly connected, as above described, to shaft 17. In this way, the rotation of the shell 13 in either direction is readily accomplished, the movement of the collar 19 being effected by means of a shipper lever 28 which is pivoted to the chassis framework at 29. It will be understood that the above described mechanism for rotating the shell 13 in either direction from the motor of the vehicle is merely illustrative, and of itself forms no essential part of my invention, since any well known reversing mechanism could be employed without departing from the principles of the invention hereinafter set forth. Or if desired, the rotation of the shell could be accomplished by hand.

The shell 13 is closed at its forward end by an end plate or cover 30, and at its rear end preferably provides an inturned annular flange 31, the space within the inner periphery of said flange being open. Secured within the shell 13 and rotatable therewith is a helical screw 32 which is of a diameter to completely fill the interior of the shell, and which is continuous from the inner end of the same to a point somewhat short of the outer end, where the blade of said screw terminates, the edge of said blade being indicated at 33. A portion 34 of the flange 31, preferably about one quarter of its circumference is hinged, as at 35, to the edge of the remaining fixed portion, and said portion 34 is adapted to be swung inwardly so as to meet the edge 33 of helical screw 32, for a purpose hereinafter described.

In the operation of loading the body which is constituted by the shell 13, the material to be loaded is conducted or conveyed in any suitable manner, as by a chute 36, Fig. 1, into the open rear end of the shell, within the flange 31, said flange at this time being continuous, by reason of the hinged portion 34 being withdrawn from the edge 33 and swung back so as to lie in the same plane as the remaining fixed portion of the flange. The material, such as coal, grain, sand, or the like, when conveyed or shoveled into the open end of the shell, is acted upon by the helical screw 32, just as soon as the rotation of said shell is started in the proper direction, the continued rotation of said shell and screw in unison serving to carry the material toward the front of the shell, as fast as said material is fed in at the rear. When the desired quantity of material has been thus loaded and moved forward in the body, the rotation of said body or shell is stopped, by disconnecting the pinion 16 from shaft 17. The truck can then be driven to the desired point of discharge, whereupon the unloading of the material from the body can be accomplished by the rotation of the shell and screw in the opposite direction from that employed for loading. Before the unloading operation is started, the hinged portion 34 is swung over into the position shown in Fig. 3, and thereupon the reverse rotation of the shell having been begun, said hinged portion becomes in effect a continuation of the screw 32 and operates to convey and direct the material to the extreme outer end of the shell, thus facilitating its discharge by gravity over the edge 37.

I claim,

1. In a truck or vehicle, a rotatable body or shell, open at one end for the charging and discharging of material, a spirally disposed member fitting the interior of said shell and rotatable therewith, said member extending longitudinally of the shell from a point adjacent said open end, and a flange at the open end of said shell for preventing the escape of material fed through said open end in the act of charging said shell, a portion of said flange being hinged, to swing inwardly toward the end of said spirally disposed member, when the material is being discharged from said shell.

2. A truck or vehicle comprising a supporting body mounted on wheels, a cylindrical shell rotatable on said body closed at one end and open at the opposite end, an interior flange at the open end, a spirally disposed member fitting the interior of the shell and rotatable therewith, said member extending from a point adjacent the open end of the shell to the closed end, said interior flange having a section hinged to swing inwardly and contact with the end of the spirally disposed member, and means for rotating said shell in opposite directions.

3. A truck or vehicle comprising a body portion mounted on wheels, a shell rotatably supported on said body, a shaft beneath said body, means for rotating the shaft, means for operatively connecting said shaft and shell to rotate the shell in opposite directions, a spirally disposed member attached to the interior of said shell and extending from one end to a point adjacent the opposite end, and a hinged member contacting with said spirally disposed member to effect the discharge of the load when the shell is rotated in one direction.

RALPH L. MORGAN.

Witnesses:
NELLIE WHALEN,
GEO. H. KENNEDY, Jr.